United States Patent [19]

Jackson

[11] 4,172,801

[45] Oct. 30, 1979

[54] CLAY-FREE WELLBORE FLUID

[75] Inventor: Jack M. Jackson, Houston, Tex.

[73] Assignee: Brinadd Company, Houston, Tex.

[21] Appl. No.: 901,475

[22] Filed: May 1, 1978

Related U.S. Application Data

[60] Division of Ser. No. 772,436, Feb. 28, 1977, Pat. No. 4,140,639, which is a continuation-in-part of Ser. No. 558,815, Mar. 17, 1975, abandoned, which is a continuation-in-part of Ser. No. 558,817, Mar. 17, 1975, Pat. No. 4,025,443.

[51] Int. Cl.$^2$ ................................................. C09K 7/02
[52] U.S. Cl. ............................. 252/8.5 A; 252/8.5 C; 252/8.55 R
[58] Field of Search .............. 252/8.5 A, 8.5 B, 8.5 C, 252/8.55 R; 106/208

[56] References Cited

U.S. PATENT DOCUMENTS

| 2,908,597 | 10/1959 | Owen | 252/8.5 X |
| 3,677,961 | 7/1972 | Browning et al. | 252/8.5 X |
| 3,988,246 | 10/1976 | Hartfiel | 252/8.5 |
| 4,003,838 | 1/1977 | Jackson et al. | 252/8.5 |

FOREIGN PATENT DOCUMENTS 771110  3/1957  United Kingdom ..................... 252/8.5

*Primary Examiner*—Herbert B. Guynn
*Attorney, Agent, or Firm*—Kenneth H. Johnson

[57] ABSTRACT

A clay-free, i.e., non-argillaceous brine wellbore fluid having unstructured viscosity and improved water loss properties from an additive composition present in an amount of 0.1 to 3 weight % based on wellbore fluid and consisting essentially of 15 to 95 weight % of guar gum or hydroxyalkyl guar gum and 5 to 85 weight % of a water soluble salt, preferably alkaline earth salt of lignosulfonate.

5 Claims, No Drawings

CLAY-FREE WELLBORE FLUID

This application is a division of application Ser. No. 772,436, filed Feb. 28, 1977, now U.S. Pat. No. 4,140,639, and which is a continuation-in-part of application Ser. No. 558,815, filed Mar. 17, 1975, now abandoned, and application Ser. No. 558,817, filed Mar. 17, 1975, now U.S. Pat. No. 4,025,443.

BACKGROUND OF THE INVENTION

The present invention lies in the field of additives to wellbore fluids used while drilling wells in earth formations, completion operations after the drilling has been completed, workover, fracturing, and various other operations in a wellbore, that is, all of those fluids which are employed over the course of the life of a well.

Particularly, the invention is concerned with stabilized additives to non-clay wellbore fluids such as various brines and emulsions of water and oil, more particularly the invention relates to additive compositions for use in wellbore fluids and to wellbore fluid containing these additive compositions.

Generally wellbore fluids will be either clay-based or brines which are clay free. Fresh water systems are sometimes used, but the brines have certain advantages which are discussed below. These two classes are exclusive, that is, clay-based drilling fluids are not brines. A wellbore fluid can perform any one or more of a number of functions. For example, the drilling fluid will generally provide a cooling medium for the rotary bit and a means to carry off the drilled particles. Since great volumes of drilling fluid are required for these two purposes, the fluids have been based on water. Water alone, however, does not have the capacity to carry the drilled particles from the borehole to the surface.

In the drilling fluid class, clay-based fluids have for years preempted the field, because of the traditional and widely held theory in the field that the viscosity suitable for creating a particle carrying capacity in the drilling fluid could be achieved only with a drilling fluid having thixotropic properties, that is, the viscosity must be supplied by a material that will have sufficient gel strength to prevent the drilled particles from separating from the drilling fluid when agitation of the drilling fluid has ceased, for example, in a holding tank at the surface.

In order to obtain the requisite thixotropy or gel strength, hydratable clay or colloidal clay bodies such as bentonite or fuller's earth have been employed. As a result the drilling fluids are usually referred to as "muds". In other areas where particle carrying capacity may not be as critical, such as completion or workover, brine wellbore fluids are extensively employed. The use of clay-based drilling muds has provided the means of meeting the two basic requirements of drilling fluids, i.e., cooling and particle removal. However, the clay-based drilling muds have created problems for which solutions are needed. For example, since the clays must be hydrated in order to function, it is not possible to employ hydration inhibitors, such as calcium chloride, or if employed, their presence must be at a level which will not interfere with the clay hydration. In certain types of shales generally found in the Gulf Coast area of Texas and Louisiana, there is a tendency for the shale to disintegrate by swelling or cracking upon contact with the water, if hydration is not limited. Thus the uninhibited clay-based or fresh water drilling fluids may be prone to shale disintegration.

The drilled particles and any heaving shale material will be hydrated and taken up by the conventional clay-based drilling fluids. The continued addition of extraneous hydrated solid particles to the drilling fluid will increase the viscosity and necessitated costly and constant thinning and reformulation of the drilling mud to maintain its original properties.

Another serious disadvantage of the clay-based fluids is their susceptibility to the detrimental effect of brines which are often found in drilled formations, particularly Gulf Coast formations. Such brine can have a hydration inhibiting effect, detrimental to the hydration requirement for the clays.

A third serious disadvantage of clay-based drilling fluids arise out of the thixotropic nature of the fluid. The separation of drilled particles is inhibited by the gel strength of the drilling mud. Settling of the drilled particles can require rather long periods of time and require settling ponds of large size.

Other disadvantages of clay-based drilling fluids are their (1) tendency to prevent the escape of gas bubbles, when the viscosity of the mud rises too high by the incidental addition of hydratable material, which can result in blowouts; (2) the ned for constant human control and supervision of the clay-based fluids because of the expectable, yet unpredictable, variations in properties; and (3) the formation of a thick cake on the internal surfaces of the wellbore.

Fresh water wellbore fluids avoid many of the clay-based fluid problems, but may cause hydration of the formation. The brines have the advantage of containing hydration inhibiting materials such as potassium chloride, calcium chloride or the like. Quite apparently any solid particulate material would be easily separated from the brine solution since it is not hydrated. Thus, the properties of the brine are not changed by solid particulate matter from the wellbore. Similarly, since there is no opportunity for gas bubbles to become entrapped, blowouts are less likely in a clay-free brine-type wellbore fluid.

Thus, the wellbore art now has two competing and incompatible water based systems which can be used in a full range of wellbore operations, i.e., the problem plagued clay-based wellbore fluids or the improved clay-free wellbore fluids, principally brines. In many areas of application, as noted above, clay-free brines are already the usual selection.

Quite frequently guar gum has been used as a water loss control agent in wellbore fluids, in the same manner as starch, other natural gums, such as karaya, psyllium, tragacanth, talha, locust bean, ghatti and the like, cellulosic derivatives, such as carboxymethyl cellulose, carboxymethyl hydroxyethyl cellulose, synthetic polymers such as polyacrylic acid, polyethylene glycol etc. However, the stability of these materials has been a continuing problem, which usually means early and frequent make up of the water loss control material in wellbore operations.

When a non-clay wellbore fluid is used for a purpose requiring relatively high viscosity, for example drilling, it is generally necessary to employ an additive to thicken the fluid to the point where it will have the necessary carrying capacity. Several additives to increase viscosity are commercially available, but most if not all of these have one or more limitations. The viscosifier may be slow to yield, i.e., it may take 15 minutes or more from the time of addition to the time when the fluid becomes thick enough to carry the cuttings. The additives may be effective over only a narrow low temperature range, permitting the fluid to thin out again when a higher temperature is reached. In addition, most of the viscosifiers have a limited service life, again thinning out after a period of use.

Many of the water loss additives have been found to be suited for providing non-structured viscosity to non-clay wellbore fluids. Guar gum and/or hydroxyalkyl guar gum can provide non-structured, i.e., non-thixotropic viscosity to wellbore fluids. These materials are water soluble and nonionic, thus they are not susceptible to being expelled from a brine solution, for example as are the soluble salts of carboxymethyl cellulose. The term "non-structured viscosity" as used here means one wherein viscosity is obtained by physio-chemical rather than by physical means. Asbestos and attapulgite are examples of the types of materials employed to obtain structured viscosity.

The non-structured viscosity provides another unique benefit in that the carrying capacity will vary in the agitated and non-agitated states, so that when, for example, the agitation is reduced in a separating tank the carrying capacity will drop off and the cuttings and the like from the wellbore will fall out of the fluid, yet when agitated there is ample carrying capacity to carry the cuttings and the like to the surface from the wellbore.

It is an advantage of the present additive compositions that they have extended stability and effectiveness over a higher temperature range. A particular feature is that faster yields are obtained by using the additive composition in wellbore fluids. A particular advantage of the present additive composition is that the water loss effectiveness is greater, and is extended beyond that normally achieved with guar gum and hydroxyalkyl guar gum. These and other advantages and features of the present invention will be apparent from the disclosure, descriptions and teachings set out below.

SUMMARY OF THE INVENTION

Briefly stated the present invention is an additive composition for use in brine wellbore fluids consisting essentially of from 15 to 95 weight percent guar gum or hydroxyalkyl guar gum and from 5 to 85 weight percent of a salt of lignosulfonate based on the total of guar or hydroxyalkyl guar and lignosulfonate salt. Preferably the additive composition will consist essentially of from 25 to 75 weight percent guar gum or hydroxyalkyl guar gum and 25 to 75 weight percent of a lignosulfonate salt on the same basis.

The brine wellbore fluids containing a water loss reducing amount of the additive composition as defined above are also a part of this invention.

A water loss reducing amount is used herein to mean that amount of the defined additive composition which will reduce the water loss of the brine wellbore over an untreated wellbore fluid and is preferably from about 0.1 to 3 weight percent of the additive composition as defined, based on the weight of wellbore fluid.

It has been surprisingly found that the combination of guar gum or hydroxyalkyl guar gum and salt of lignosulfonate produce an unexpected improvement in fluid loss over either component alone. One may have expected an additive improvement in fluid loss, but a completely unexpected synergistic improvement has been found to result. The presence of magnesia or magnesium hydroxide in amounts of 10% or more also provide additional improvement in fluid loss.

DETAILED DESCRIPTION OF THE INVENTION AND PREFERRED EMBODIMENTS

Guar gum is a natural vegetable colloid commercially produced in the form of a powder. Commercial guar gum is a component of the legumenous seed *Cyamopsis tetragonaloba*. The gum occurs in the endosperm of these seeds where its natural function is to reserve food supply for the developing plant. Guar gum is a polysaccharide consisting of a complex carbohydrate polymer of galactose and mannose and is chemically classified as a galactomannan.

Natural guar gum has a number of hydroxyls which readily react with alkylene oxides such as ethylene oxide, propylene oxide or butylene oxide. In addition reactive alkylene oxides include the homologs of these compounds represented by the general formulas:

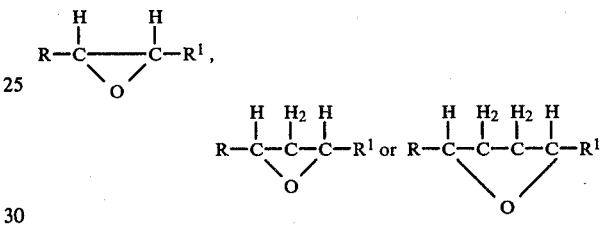

where R is an alkyl radical has 1 to 6 carbon atoms and $R^1$ is hydrogen or an alkyl radical having 1 to 6 carbon atoms. The homologous oxides react with the hydroxyl of the guar gum to produce hydroxy ethers with the hydroxyl group not terminally situated, for example 1,2-epoxy butane produces β-hydroxy butyl guar gum whereas ethylene oxide, propylene oxide or butylene oxide produce hydroxy alkylated ethers with the hydroxyl on the terminal carbon of the alkylated chain, e.g., 1,4-epoxy butane reacts with guar gum to produce 4-hydroxy butyl guar gum.

In addition the two, three and four membered rings, higher-membered rings may be used to synthesize the hydroxy alkylated guar gum, however such higher membered rings are less chemical reactive, hence the practical likelihood of the economic preparation of this type of hydroxy alkylated guar gum is remote. The two and three membered rings are the most reactive and offer the likelihood of producing hydroxy alkylated guar gum on an economic level that may be used realistically as a wellbore fluid additive.

Both hydroxy ethylated and hydroxy propylated guar gum are currently commercially available at costs competitive with other non-thixotropic wellbore fluid viscosifiers, particularly if the excellent yield and filtrate properties are considered.

A preferred group of hydroxy guar gum ethers are hydroxyethyl guar gum, 3-hydroxy propyl guar gum, 4-hydroxybutyl guar gum, 2-hydroxy butyl guar gum, 2-hydroxy propyl guar gum, and 3-hydroxy butyl guar gum.

Magnesia is a highly infusible magnesium oxide (MgO), prepared by the calcination of magnesium carbonate, ($MgCO_3$). Magnesia is only slightly soluble in water, e.g., 0.0086 grams/100 cc (86 ppm) of water at 30° and is essentially nonhydratable. One theory for the benefit of magnesia is that the very slightly soluble magnesia which is present in excess of its solubility in the wellbore fluid provides a reservoir of basicity of just the correct amount to maintain the pH of the fluid in the range at which the additive components are most stable. Magnesium hydroxide may be similarly viewed. This theory is proposed as a possible explanation for the operation of magnesia and magnesium hydroxide.

The slight solubility of magnesia and magnesium hydroxide in wellbore fluids results in a very low magnesium ion concentration, that is, for example MgO has less than 0.001 % or 10 ppm of magnesium ion concentration or dissolved magnesium, yet the pH remains strongly alkaline when employed in stabilizing amounts. The amount of magnesia or magnesium hydroxide in the composition may be greater than 50 weight percent without detriment to the operation of the composition in the wellbore fluid, e.g., several hundred times the specified minimum amount may be added with no ill effect on the viscosifier (guar gum or hydroxy alkyl guar gum) or the drilling fluid.

The amount of the composition employed in the wellbore fluid is not critical and may vary for different applications of the fluid. Generally at least 0.5 pounds up to about 5 or 10 pounds of guar gum or hydroxy alkyl guar gum per U.S. barrel (42 U.S. gallons) will be employed. In addition, there may be at least 0.05 ppb of magnesia or magnesium hydroxide present in the wellbore fluid. This minimum amount of magnesia and magnesium hydroxide represents an excess of magnesia beyond that soluble in the wellbore fluid, e.g., greater than 0.0035 pounds of magnesia per barrel of water.

Lignosulfonate water soluble salts are known as water loss reduction agents. However, the synergistic effect obtained with guar gum or hydroxyalkyl guar gum has not been known. Some suitable water soluble lignosulfonate salts are alkali and alkaline earth metal salts, chromium salts, iron salts, lead salts, ammonium salts thereof and the like. The alkali and alkaline earth lignosulfonate salts form a preferred embodiment, in particular sodium and calcium salts thereof.

In addition to the guar gum and hydroxyalkyl guar gum, and the lignosulfonate salts such as calcium lignosulfonate and sodium lignosulfonate, other conventional wellbore additives, density modifying material such as calcium chloride, sodium chloride and zinc chloride may be present. In other words, any of the known additive materials may be added so long as the basic characteristics of the non-clay wellbore fluid are not changed.

It has been found that the pH of the drilling fluid after combining it with the additive composition of the present invention should be highly alkaline, i.e., preferably about 8.5 or more preferably 8.5 to about 11 to obtain yield.

Brines provide the wellbore fluid of the present invention, and generally containing at least 1.0% by weight of a soluble salt of potassium, sodium or calcium in water. In addition, the brine may contain other soluble salts, for example, zinc, chromium, iron, copper and the like. Generally, the chlorides are employed because of availability, but other salts such as the bromides, sulfates and the like may be used. The soluble salts of the brine, not only furnish the weighting material by adjusting the density of the solution, but also typically furnish the cations for inhibiting the fluid against hydration of solid materials.

The wellbore fluid will contain a substantial amount of water, i.e., it is an aqueous based brine fluid. Oil may be present to form water-oil wellbore fluids with appropriate emulsifiers as known in the art. The present additive composition and amounts in the wellbore fluid, however, relate only to the aqueous portion.

One embodiment of the present invention is a wellbore fluid consisting essentially of water and an electrolyte inhibitor for preventing hydration, selected from the group consisting of at least 600 ppm calcium ion, at least 200 ppm aluminum ion or chromium ion, at least 1,500 ppm potassium chloride, at least 5000 ppm sodium chloride and combinations thereof.

EXAMPLES 1–33

In these Examples the components were added to a brine solution of NaCl. The additives, other than guar gum or hydroxyalkyl guar gum (if any) were added to the brine first followed by the guar gum. The samples were dynamically aged for 16 hours at 175° F., cooled to room temperature (75° F.), stirred 5 minutes and tested.

The compositions, tests and results are set out below in Table I and Table II.

The data shows the synergistic improvement in fluid loss in brine for guar or hydroxypropyl guar gum and calcium lignosulfonate.

TABLE I

| Example No | 1 | 2 | 3 | 4 | 5 | 6 | 7 | 8 | 9 | 10 | 11 | 12 |
|---|---|---|---|---|---|---|---|---|---|---|---|---|
| 9.1 ppg NaCl Brine, bbl | 1 | 1 | 1 | 1 | 1 | 1 | 1 | 1 | 1 | 1 | 1 | 1 |
| Guargum, ppb | 1.75 | 1.75 | 1.75 | 1.75 | 1.75 | 1.75 | 1.75 | 1.75 | 1.7 | 1.7 | 1.7 | 1.7 |
| MgO, ppb | .2 | .6 | 1.0 | 2.0 | 5.0 | | | | | | 0.9 | |
| Mg(OH)$_2$,ppb | | | | | | .2 | .6 | 1.0 | | | | 0.9 |
| Calcium Ligno-Sulfonate, ppb | | | | | | | | | | 1.7 | 1.7 | 1.7 |
| Apparent Viscosity, cp | 20 | 23.5 | 24 | 23 | 254 | 20.5 | 20 | 22.5 | 15.5 | 7.5 | 17.5 | 16 |
| Plastic Viscosity, cp | 13 | 14 | 14 | 14.5 | 14.5 | 13 | 12 | 13 | 11 | 7 | 12.5 | 12 |
| Yield Point #/100 sq.ft. | 14 | 19 | 20 | 18.5 | 22.5 | 15 | 16 | 19 | 9 | 1 | 10 | 8 |
| Gels, Initial/10 min. | 3/3 | 3/3 | 3/3 | 3/3 | 4/4 | 2/2.5 | 2/3 | 3/3 | 2/3 | 2/3 | 2/3 | 2/2 |
| pH | 9.8 | 9.9 | 9.8 | 9.9 | 10.0 | 8.7 | 9.0 | 9.2 | 7.6 | 6.9 | 9.8 | 8.5 |
| API Fluid Loss, cc | 110.0 | 98.0 | 94.0 | 88.0 | 64.3 | 176.0 | 80.5 | 147.0 | 105 | 24 | 18 | 60 |

| Example No. | 13 | 14 | 15 | 16 | 17 | 18 | 19 |
|---|---|---|---|---|---|---|---|
| 9,1 ppg NaCl Brine, bbl | 1 | 1 | 1 | 1 | 1 | 1 | 1 |

TABLE I-continued

| | | | | | | | |
|---|---|---|---|---|---|---|---|
| Guargum, ppb | | | | | 3.4 | | |
| MgO, ppb | | .9 | | .6 | | | |
| Mg(OH)$_2$, ppb | | | | | | | |
| HPC* | | | | | | 3.4 | |
| Calcium Ligno-Sulfonate, ppb | 1.7 | 1.7 | 2.0 | 2.0 | 3.4 | | |
| Apparent Viscosity, cp | 2 | 2 | 2 | 2 | 1.5 | 56 | 45 |
| Plastic Viscosity, cp | 2 | 2 | 2 | 2 | 1 | 27 | 20 |
| Yield Point #/100 sq.ft. | 0 | 0 | 0 | 0 | 1 | 58 | 50 |
| pH | 5.8 | 9.5 | 6.6 | 9.4 | 6.2 | 7.0 | 7.4 |
| API Fluid Loss, cc | 190 | 75 | 120 | 65 | 50 | 37.0 | 80 |

*Hydroxypropyl guar gum

TABLE II

| Example No. | 20 | 21 | 22 | 23 | 24 | 25 | 26 | 27 | 28 | 29 | 30 | 31 | 32 | 33 |
|---|---|---|---|---|---|---|---|---|---|---|---|---|---|---|
| 9.1 ppg NaCl Brine, bbl | 1 | 1 | 1 | 1 | 1 | 1 | 1 | 1 | 1 | 1 | 1 | 1 | 1 | 1 |
| HPG, ppb | 1.75 | 1.75 | 1.75 | 1.75 | 1.75 | 1.75 | 1.75 | 1.75 | 1.75 | 1.75 | 1.75 | 1.75 | 1.75 | 1.75 |
| MgO, ppb | | | | .01 | .05 | .1 | .2 | .6 | 1.0 | 2.0 | 5.0 | | | |
| Mg(OH)$_2$, ppb | | | | | | | | | | | | .2 | .6 | 1.0 |
| 10% HCl, cc | 1.0 | | | | | | | | | | | | | |
| Apparent Viscosity, cp | 20.8 | 22 | 20.3 | 20.3 | 21.5 | 23 | 21 | 22 | 22.5 | 23¼ | 24.5 | 20 | 21 | 21 |
| Plastic Viscosity, cp | 12 | 13 | 12 | 12.5 | 12 | 14 | 12 | 13 | 12 | 13.5 | 13.5 | 12 | 12 | 12 |
| Yield Point, #/100 sq.ft. | 7.5 | 18 | 16.5 | 16.5 | 19.0 | 18 | 18 | 18 | 21 | 19.5 | 22 | 16 | 18 | 18 |
| Gels, Initial/10 min. | 3/3 | 3/3 | 3/3 | 3/3 | 4/4 | 4/4 | 4/4 | 4/4 | 4/4 | 4/4 | 4/4 | 3/3 | 3/3 | 3/4 |
| pH | 6.9 | 8.2 | 7.6 | 8.5 | 9.4 | 9.8 | 9.9 | 9.95 | 10.0 | 10.1 | 10.3 | 8.9 | 9.4 | 9.4 |
| API Fluid Loss, cc | 250+ | 258+ | 327 | 315+ | 326 | 311 | 253 | 159 | 130 | 178 | 90.8 | 321+ | 285 | 208 |

EXAMPLES 34–33

These compositions and tests were done in the same manner as those of Examples 1–33. The results are set out in Table III.

TABLE III

| Example No. | 34 | 35 | 36 | 37 | 38 |
|---|---|---|---|---|---|
| Brine, 1 bbl | 9.1 ppg NaCl | 9.1 ppg NaCl | 9.1 ppg NaCl | 9.1 ppg NaCl | 9.1 ppg NaCl |
| HPG, ppb | 2 | 2 | 2 | 2 | 2 |
| Calcium LignoSulfonate, ppb | | 2 | 2 | | |
| Magnesium Oxide, ppb | | | 0.6 | 0.6 | |
| Magnesium Hydroxide, ppb | | | | | 0.6 |
| TEST DATA: | | | | | |
| Apparent Viscosity, cp | 25 | 11 | 22.5 | 26.5 | 25.1 |
| Plastic Viscosity, cp | 13 | 9 | 13 | 14 | 13.5 |
| Yield Point, #/100 sq.ft. | 24 | 4 | 19 | 25 | 24 |
| Gels, Initial/10 Min. | 4/4 | 3/3 | 4/4 | 5/5 | 4/4 |
| pH | 7.8 | 6.7 | 9.8 | 9.9 | 9.3 |
| API Fluid Loss, cc | 323 | 67 | 39.8 | 180 | 249 |

EXAMPLES 39–50

These examples demonstrate the range of relative amounts of guar gum or hydroxyalkyl guar gum over which the synergistic improvement in water loss was observed (note Examples 43 and 49 are outside the scope of the claims). The samples for testing were made up in the same manner as Examples 1–33 and tested in the same manner. The results are reported in Table IV.

TABLE IV

| Example No. | 39 | 40 | 41 | 42 | 43 | 44 | 45 | 46 | 47 | 48 | 49 | 50 |
|---|---|---|---|---|---|---|---|---|---|---|---|---|
| Brine, 1 bbl | 9.1 ppg NaCl | 9.1 ppg NaCl | 9.1 ppg NaCl | 9.1 ppg NaCl | 9.1 ppg NaCl | 9.1 ppg NaCl | 9.1 NaCl | 9.1 NaCl | 9.1 NaCl | 9.1 NaCl | 9.1 NaCl | 9.1 NaCl |
| Guar Gum ppb | 1.9 | 1.7 | 1.5 | .5 | .3 | .1 | | | | | | |
| HPG, ppb | | | | | | | 1.9 | 1.7 | 1.5 | .5 | .3 | .1 |
| Calcium LignoSulfonate, ppb | .1 | .3 | .5 | 1.5 | 1.7 | 1.9 | .1 | .3 | .5 | 1.5 | 1.7 | 1.9 |
| TEST DATA: | | | | | | | | | | | | |
| Apparent Viscosity, cp | 16.5 | 14 | 7.5 | 3 | 3 | 2 | 12 | 8.5 | 6.5 | 3 | 3 | 2.5 |
| Plastic Viscosity, cp | 13 | 11 | 7 | 2 | 3 | 2 | 10 | 8 | 6 | 2 | 2 | 2 |
| Yield Point, #/100 sq.ft. | 7 | 6 | 1 | 2 | 0 | 1 | 5 | 1 | 1 | 2 | 2 | 1 |
| pH | 7.6 | 7.4 | 7.4 | 7.0 | 6.8 | 7.0 | 7.3 | 7.3 | 7.3 | 6.8 | 6.9 | 6.8 |
| API Fluid Loss, cc | 35 | 40 | 23 | 33 | 47 | 50 | 37 | 40 | 37 | 41 | 73 | 90 |

The invention claimed is:

1. An additive composition for use in clay-free, brine wellbore fluids having improved fluid loss properties consisting essentially of from 25 to 75 weight percent guar gum and from 25 to 75 weight percent of an alkaline earth metal salt of lignosulfonate, said additive composition being characterized such that incorporation thereof into said clay-free brine results in a nonthixotropic fluid.

2. The additive composition according to claim 1 wherein said lignosulfonate salt is calcium lignosulfonate.

3. A clay-free, non-thixotropic brine wellbore fluid consisting essentially of at least 1% of a soluble salt of potassium, sodium or calcium in water and a water loss reducing amount of an additive composition consisting essentially of 25 to 75 weigth percent guar gum and from 25 to 75 weight percent of an alkaline earth metal salt of lignosulfonate.

4. The brine wellbore fluid according to claim 3 containing from about 0.1 to 3 weight percent of said additive composition, based on the weight of wellbore fluid.

5. The brine wellbore fluid according to claim 3 wherein said lignosulfonate salt is calcium lignosulfonate.

* * * * *

UNITED STATES PATENT AND TRADEMARK OFFICE
CERTIFICATE OF CORRECTION

PATENT NO. : 4,172,801
DATED : October 30, 1979
INVENTOR(S) : Jack M. Jackson

It is certified that error appears in the above—identified patent and that said Letters Patent is hereby corrected as shown below:

Column 2, line 26 reads "the ned" but should read -- the need --

Column 5-6, TABLE I, under "4" opposite "Apparent Viscosity, cp" reads " 231" but should read -- 23 3/4 --

Column 5-6. TABLE I, under "5" opposite "Apparent Viscosity, cp" reads "254" but should read -- 25 1/4 --

Signed and Sealed this

Fourteenth Day of July 1981

[SEAL]

Attest:

GERALD J. MOSSINGHOFF

Attesting Officer   Commissioner of Patents and Trademarks